(12) United States Patent
Matsumi

(10) Patent No.: US 9,742,930 B2
(45) Date of Patent: Aug. 22, 2017

(54) IMAGE READING APPARATUS CONFIGURED TO READ DOCUMENT

(71) Applicant: Brother Kogyo Kabushiki Kaisha, Nagoya-shi, Aichi-ken (JP)

(72) Inventor: Takashi Matsumi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/220,556

(22) Filed: Jul. 27, 2016

(65) Prior Publication Data
US 2017/0034364 A1 Feb. 2, 2017

(30) Foreign Application Priority Data
Jul. 29, 2015 (JP) .................................. 2015-149281

(51) Int. Cl.
*H04N 1/00* (2006.01)
*H04N 1/028* (2006.01)
*H04N 1/403* (2006.01)

(52) U.S. Cl.
CPC ..... *H04N 1/00087* (2013.01); *H04N 1/00013* (2013.01); *H04N 1/00068* (2013.01); *H04N 1/00761* (2013.01); *H04N 1/0281* (2013.01); *H04N 1/02815* (2013.01); *H04N 1/403* (2013.01); *H04N 2201/0094* (2013.01)

(58) Field of Classification Search
CPC ........... H04N 1/00087; H04N 1/00013; H04N 1/00068; H04N 1/00761; H04N 1/0281; H04N 1/02815; H04N 1/403; H04N 2201/0094
See application file for complete search history.

(56) References Cited

FOREIGN PATENT DOCUMENTS

| JP | 2000-125094 A | 4/2000 |
| JP | 2011-151478 A | 8/2011 |
| JP | 5198485 B2 | 5/2013 |

*Primary Examiner* — Christopher D Wait
(74) *Attorney, Agent, or Firm* — Banner & Witcoff, Ltd.

(57) ABSTRACT

An image reading apparatus includes a gray reference member, a reading unit, an adjusting unit, a calibration unit, a storage unit, and a control unit. The control unit is configured to execute a first preprocessing and a second preprocessing. The first preprocessing includes: acquiring first black data from one line worth of image data; acquiring white data; calculating white-black difference data; acquiring first light gray data; and calculating first light gray-black difference data. The second processing includes: acquiring second black data from the one line worth of the image data; acquiring second light gray data; calculating second light gray-black difference data; calculating a change ratio by dividing the second light gray-black difference data by the first light gray-black difference data; and calculating calibration data by multiplying the white-black difference data by the change ratio. Shading of the image data is calibrated in response to the calibration data.

12 Claims, 8 Drawing Sheets

IMAGE READING APPARATUS CONFIGURED TO READ DOCUMENT

CROSS REFERENCE TO RELATED APPLICATION

This application claims priority from Japanese Patent Application No. 2015-149281 filed Jul. 29, 2015. The entire content of the priority application is incorporated herein by reference.

TECHNICAL FIELD

The present disclosure relates to an image forming apparatus configured to read an original document.

BACKGROUND

A conventional image reading apparatus uses a white color reference member for a shading calibration, and reads a reading side of an original document passing through the white reference member. However, a shadowing phenomenon, in which variation of color density on the other side of the original document is shown and read throw the original document, may occur in the reading operation of the image reading apparatus. In order to reduce the shadowing phenomenon, a gray reference member is provided for some image reading apparatuses.

SUMMARY

For example, Japanese Patent Application Publication No. 2000-125094 (D1) discloses an image reading apparatus in which a reference member having a color other than white is provided at the document guide of its document conveying unit.

Meanwhile, Japanese Patent No. 5198485 (D2) discloses an image reading apparatus that determines a calibration value for its shading calibration. According to D2, before shipping or during its maintenance operation, the image reading apparatus reads a white reference chart to acquire first reference image data, and the image reading apparatus further reads the white reference member to thereby acquire second reference image data. The image reading apparatus that has been turned ON (activated) by a user further acquires third reference image data by reading the white reference member before reading an original document. The calibration value for the shading calibration is calculated by multiplying the first reference image data by the third reference image data and by dividing the product by the second reference image data.

In this paragraph, it is assumed that the image reading apparatus disclosed in D1, which has the non-white reference member, could store white reference data corresponding to the first reference image data and could determine the calibration value between the activation and the reading operation of the original document, as disclosed in D2. In general, changing amount of the image data acquired by the reading operation can be greater in a white color image than in a black color image, if the variation of color density is the same between the white original document and the black original document that have been read by the image reading apparatus. In other words, the changing amount of image output is greater in white color than in black color, even if the color density of the original document is varied by the same amount. Accordingly, the changing amount of image output can be different between the two cases: when reading the non-white reference member and when reading the white reference member. Because of the difference, the changing amount of the image output generated by reading the non-white reference member at the two opportunities, before shipment and between the activation and the reading operation, is different from the changing amount caused by reading the white reference member at the same two opportunities. As a result, the conventional image reading apparatus has had a technical problem that the reference data acquired from the non-white member cannot be used to adjust the white reference data that is acquired from the white reference member and proper calibration data therefore cannot be calculated or determined.

It is therefore an object of the disclosure to provide an image reading apparatus that can determine the calibration data between the activation and the reading operation by employing the white reference data and the non-white reference data that is acquired from the non-white reference member.

According to one aspect, the disclosure provides an image reading apparatus including: a gray reference member, a reading unit, an adjusting unit, a calibration unit, a storage unit, and a control unit. The gray reference member is colored in gray having a reflection ratio lower than that of white. The reading unit is configured to irradiate light onto an original document or the gray reference member to read images thereon on a line-to-line basis and produce image data. The adjusting unit is configured to apply an adjustment value to the reading unit. The reading unit adjusts a light amount to be irradiated onto the original document and the gray reference member in a range from zero to maximum in accordance with the adjustment value. The calibration unit is configured to calibrate shading of the image. The control unit is configured to execute a first preprocessing and a second preprocessing. The second preprocessing is executed after execution of the first preprocessing. The first preprocessing executed by the control unit includes: (a) reading with the reading unit the original document and the gray reference member without irradiating the light thereonto and producing one line worth of the image data relating to pixels arranged in one line; (b) acquiring first black data from the one line worth of the image data produced in (a); (c) reading with the reading unit a white color document upon irradiating the light having a light amount adjusted by a first adjustment value and producing one line worth of the image data relating to pixels arranged in one line; (d) acquiring white data from the one line worth of the image data produced in (c); (e) calculating, on a pixel-to-pixel basis, white-black difference data by subtracting the first black data from the white data and storing the white-black difference data in the storage unit; (f) reading with the reading unit the gray reference member upon irradiating the light having the maximum light amount and producing one line worth of the image data relating to pixels arranged in one line; (g) acquiring first light gray data from the pixels in the one line worth of the image data produced in (f); and (h) calculating, on a pixel-to-pixel basis, first light gray-black difference data by subtracting the first black data from the first light gray data and storing the first light gray-black difference data in the storage unit. The second preprocessing executed by the control unit includes: (i) reading with the reading unit the original document and the gray reference member without irradiating the light thereonto and producing one line worth of the image data relating to pixels arranged in one line; (j) acquiring second black data from the one line worth of the image data produced in (i); (k) reading with the reading unit the gray reference member upon irradiating the light having the maximum amount and producing one line worth of the image data relating to pixels arranged in one line; (l) acquiring second light gray data from the one line worth of image data produced in (k); (m) calculating, on a pixel-to-pixel basis, second light gray-black difference data by subtracting the second black data from the second light gray data and storing the second light gray-black difference data in the storage unit; (n) calculating, on a pixel-to-pixel basis, a change ratio by dividing the second light gray-black difference data by the first light gray-black difference data; and (o) calculating, on a pixel-to-pixel basis, calibration data by multiplying the white-black difference data by the change ratio. Shading of the image data is calibrated in response to the calibration data.

According to another aspect, the disclosure provides a method executed in an image reading device having a gray reference member, a reading unit, an adjusting unit, a calibration unit, a storage unit, and a control unit. The gray reference member is colored in gray having a reflection ratio lower than that of white. The reading unit is configured to irradiate light onto an original document or the gray reference member to read images thereon on a line-to-line basis and produce image data. The adjusting unit is configured to apply an adjustment value to the reading unit. The reading unit adjusts a light amount to be irradiated onto the original document and the gray reference member in a range from zero to maximum in accordance with the adjustment value. The calibration unit is configured to calibrate shading of the image. The method includes executing a first preprocessing and a second preprocessing. The second preprocessing is executed after execution of the first preprocessing. The first preprocessing executed by the control unit includes: (a2) reading with the reading unit the original document and the gray reference member without irradiating the light thereonto and producing one line worth of the image data relating to pixels arranged in one line; (b2) acquiring first black data from the one line worth of the image data produced in (a2); (c2) reading with the reading unit a white color document upon irradiating the light having a light amount adjusted by a first adjustment value and producing one line worth of the image data relating to pixels arranged in one line; (d2) acquiring white data from the one line worth of the image data produced in (c2); (e2) calculating, on a pixel-to-pixel basis, white-black difference data by subtracting the first black data from the white data and storing the white-black difference data in the storage unit; (f2) reading with the reading unit the gray reference member upon irradiating the light having the maximum light amount and producing one line worth of the image data relating to pixels arranged in one line; (g2) acquiring first light gray data from the pixels in the one line worth of the image data produced in (f2); and (h2) calculating, on a pixel-to-pixel basis, first light gray-black difference data by subtracting the first black data from the first light gray data and storing the first light gray-black difference data in the storage unit. The second preprocessing executed by the control unit includes: (i2) reading with the reading unit the original document and the gray reference member without irradiating the light thereonto and producing one line worth of the image data relating to pixels arranged in one line; (j2) acquiring second black data from the one line worth of the image data produced in (i2); (k2) reading with the reading unit the gray reference member upon irradiating the light having the maximum amount and producing one line worth of the image data relating to pixels arranged in one line; (l2) acquiring second light gray data from the one line worth of image data produced in (k2); (m2) calculating, on a pixel-to-pixel basis, second light gray-black difference data by subtracting the second black data from the second light gray data and storing the second light gray-black difference data in the storage unit; (n2) calculating, on a pixel-to-pixel basis, a change ratio by dividing the second light gray-black difference data by the first light gray-black difference data; and (o2) calculating, on a pixel-to-pixel basis, calibration data by multiplying the white-black difference data by the change ratio. Shading of the image data is calibrated in response to the calibration data.

BRIEF DESCRIPTION OF THE DRAWINGS

The particular features and advantages of the disclosure will become apparent from the following description taken in connection with the accompanying drawings, in which.

DETAILED DESCRIPTION

Figure 1:
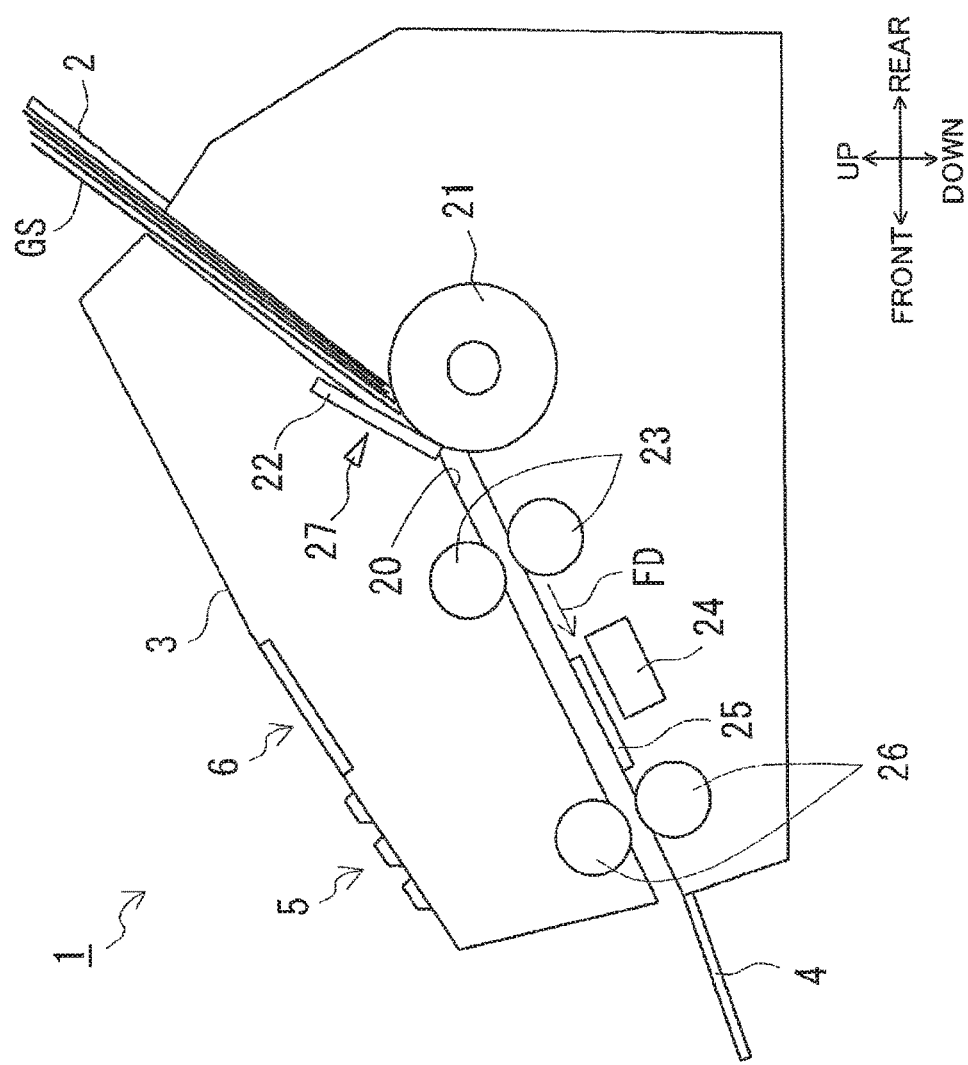
FIG. 1 illustrates a configuration inside an image reading apparatus according to an embodiment.

An image reading system, an image reading apparatus 1, and a computer 40 according to a first embodiment will be described while referring to the accompanying drawings wherein like parts and components are designated by the same reference numerals to avoid duplicating description.

The terms "upward", "downward", "upper", "lower", "above", "below", "beneath", "right", "left", "front", "rear" and the like will be used throughout the description assuming that the image reading apparatus 1 is disposed in an orientation in which it is intended to be used. In use, the image reading apparatus 1 is disposed as shown in FIG. 1.

<Mechanical Configuration of Image Reading Apparatus 1>

As illustrated in FIG. 1, the image reading apparatus 1 includes a supply tray 2, a main body 3, and a discharge tray 4. An operating unit 5 and a display unit 6 are disposed on an upper surface of the main body 3. The operating unit 5 includes a power switch and various setting buttons and receives an operation instruction from a user. For example, the operating unit 5 includes a selection button for selecting one of a color mode in three colors and a monochromatic mode in one color and an operation button for setting a reading resolution. The display unit 6 includes an LCD and displays an operation state of the image reading apparatus 1.

A conveying path is formed inside the main body 3. An original document GS placed on the supply tray 2 is conveyed along the conveying path 20 in a conveying direction FD and discharged to the discharge tray 4. A supply roller 21, a separating pad 22, a pair of upstream side conveying rollers 23, a reading unit 24, a platen glass 25, and a pair of downstream side conveying rollers 26 are disposed along the conveying path 20.

The supply roller 21 feeds, one by one, the original documents GS placed on the supply tray 2 in cooperation with the separating pad 22. The upstream side conveying roller 23 and the downstream side conveying roller 26 are driven by a conveying motor MT (see FIG. 4). The platen glass 25 has a light transmittance property and is disposed along the conveying path 20 at a lower side of the conveying path 20. The conveying rollers 23 and 26 convey the original document GS so as to allow the original document GS fed from the supply roller 21 to pass over the platen glass 25.

In the present embodiment, the original document GS is placed on the supply tray 2 such that a reading surface of the original document GS faces a placing surface of the supply tray 2. The reading unit 24 is disposed below the conveying path 20 and reads an image on the reading surface of the original document GS passing over the platen glass 25. A document sensor 27 is disposed in the supply tray 2 and is configured to be turned ON when the original document GS is placed on the supply tray 2 and turned OFF when the original document GS is not placed on the supply tray 2.

(Detail of Reading Unit 24)

Figure 2:
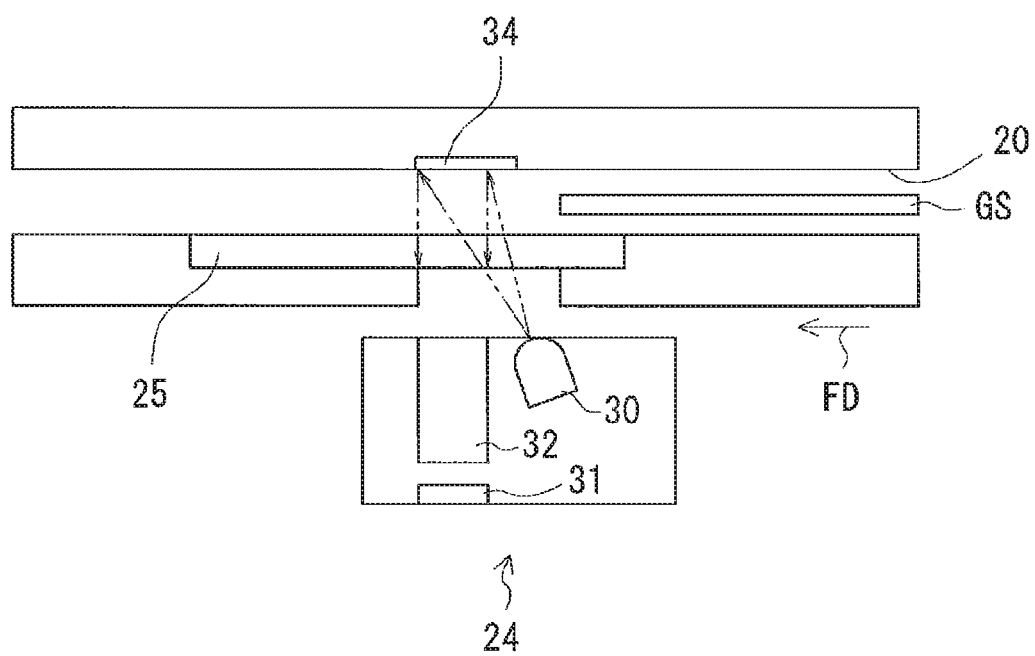
FIG. 2 is enlarged view of a reading unit of the image reading apparatus according to the embodiment.
Figure 3:
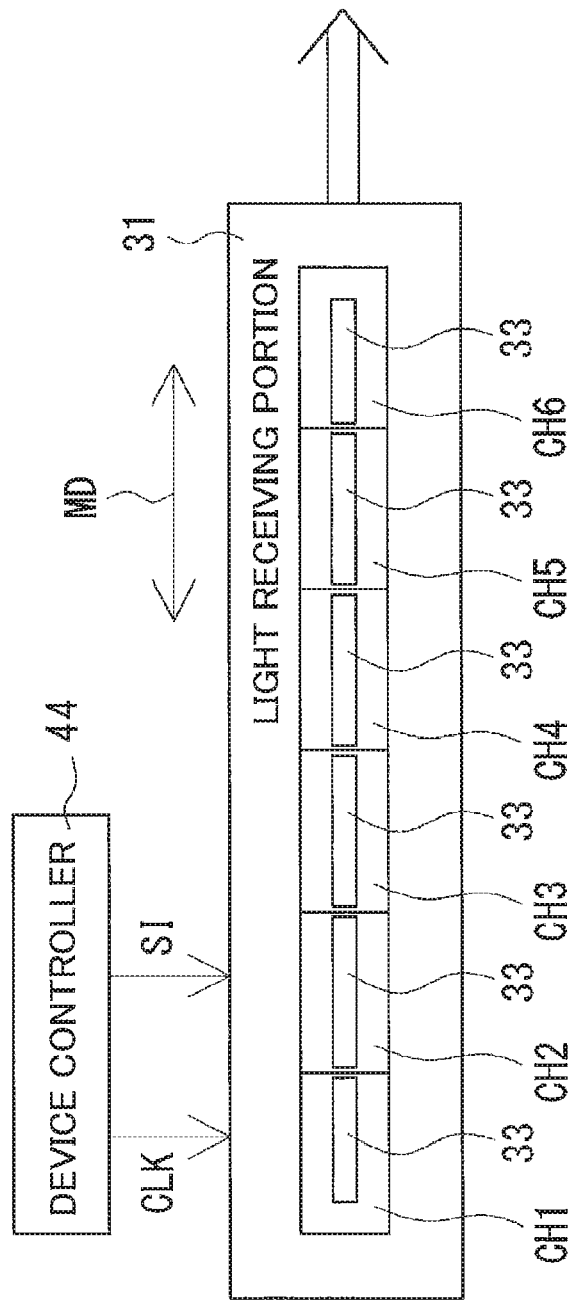
FIG. 3 illustrates a block diagram of a light receiving portion of the reading unit according to the embodiment.

Following describes the detailed configuration of the reading unit 24 with reference to FIGS. 2 and 3. The reading unit 24 includes a light source 30, a light receiving portion 31, and an optical member 32. The light source 30 includes three light emitting diodes, whose colors are red, blue, and green. Light emitted from the light source 30 is reflected by the reading surface of the original document GS, and is then led to the light receiving portion 31 by the optical member 32. When the color mode is selected in the embodiment, the three light emitting diodes sequentially irradiate light to read one line worth of the image on the original document GS. When the monochromatic mode is selected, one of the three colors, e.g. green, is emitted from one of the light emitting diodes to read the image for one line worth on the original document GS.

A gray reference plate 34 is disposed in the main body 3 to confront the reading unit 24 with respect to the conveying path 20. If the original document GS is not in the conveying path 20, light irradiated from the light source 30 is reflected by the gray reference plate 34 so as to be received by the light receiving portion 31 through the optical member 32. The optical member 32 includes a rod lens that extends in a main scanning direction MD. The gray reference plate 34 is colored in gray and has a reflection ratio lower than that of a plate in white color, which is the background color of the original document GS. The depth of the gray color in the gray reference plate 34 is close to the depth of black color, such that the reflection ratio is lower than that of a white color plate even when the light source 30 outputs its maximum amount of light, which will be described later.

The light receiving portion 31 has sensor IC chips CH1-CH6 linearly aligned in the main scanning direction MD. The sensor IC chips CH1-CH6 are numbered, where the first sensor IC chip CH1 is numbered as 1 (one) and the last sensor IC chip CH6 is numbered as 6 (six). Each of the sensor IC chips CH1-CH6 includes a photoelectric transducer 33, a shift register (not illustrated) and an amplifier (not illustrated). The first pixel is in the sensor IC chip CH1, and is specifically positioned at its edge portion that is not adjacent to the next sensor IC chip CH2; the last pixel is in the sensor IC chip CH6, and is specifically positioned at its edge portion that is not adjacent to the next sensor IC chip CH5. The pixels are numbered from the first pixel to the last pixel, and forms a group of pixels defined as "one line". In this embodiment, the light receiving portion 31 has six sensor IC chips; alternatively, the light receiving portion 31 may have more sensor IC chips than six. The sensor IC chips CH1-CH6 have output characteristics different from each other.

<Electrical Configuration of Image Reading Apparatus 1>

Figure 4:
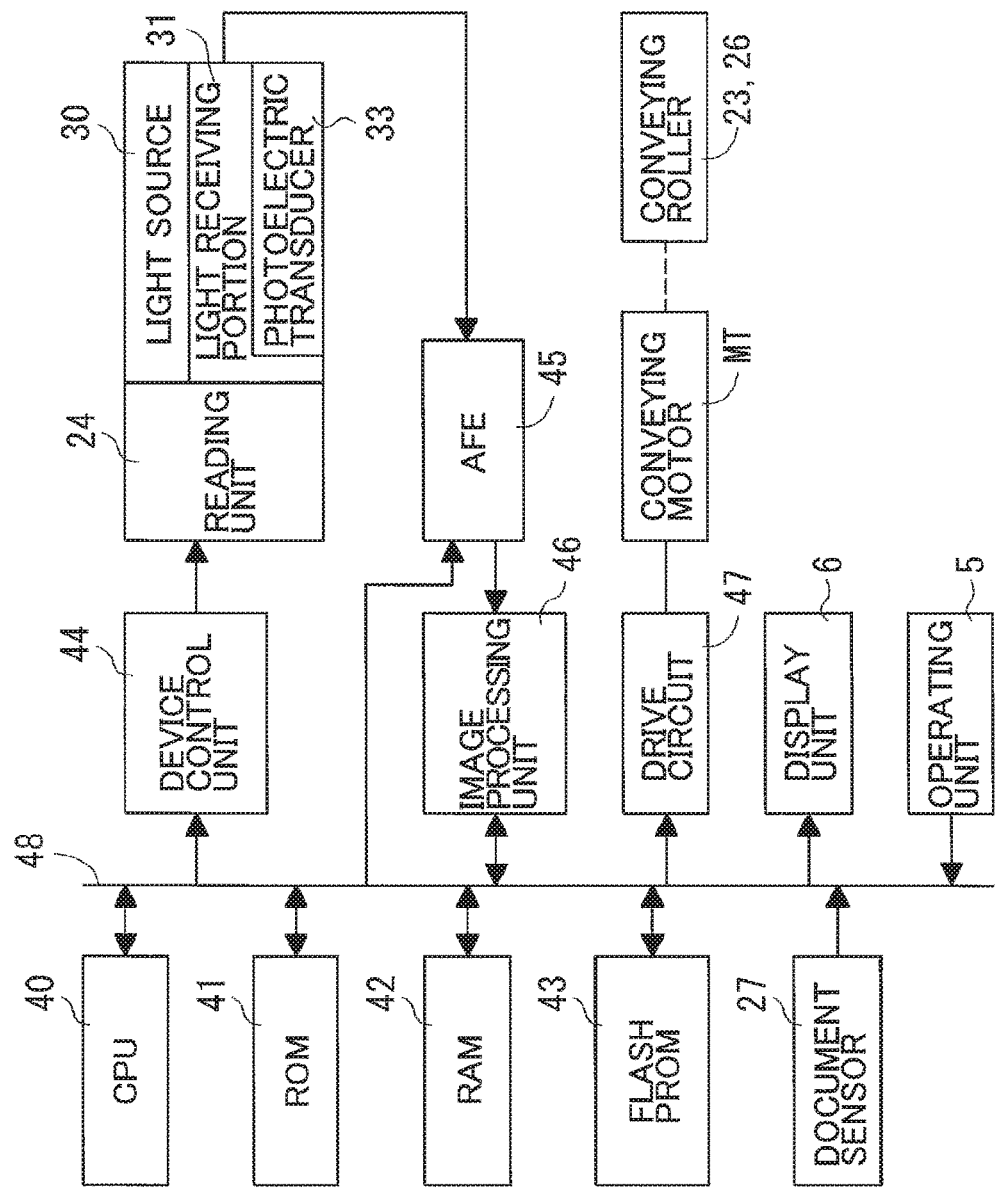
FIG. 4 illustrates a block diagram of an electric configuration of the image reading apparatus according to the embodiment.

Electrical configurations of the image reading apparatus 1 will be described with reference to FIG. 4. As illustrated in FIG. 4, the image reading apparatus 1 includes a CPU 40, a ROM 41, a RAM 42, a Flash PROM 43, a device controller 44, an analog front end 45 (referred to as AFE 45), an image processing unit 46, and a drive circuit 47 as main components. These main components are connected, via a BUS 48, to the operating unit 5, a display unit 6, and a document sensor 27.

The ROM 41 stores therein programs for executing various operations of the image reading apparatus 1, such as main maintenance operation, main reading operation, and subroutines executed during each main operation, which will be described later. The CPU 40 controls respective components or units in accordance with the program read out from the ROM 41. The flash ROM 33 is a readable/writable non-volatile memory and stores data generated by the CPU 40 during controlling processing, e.g. data generated by the main maintenance operation. The RAM 42 temporarily stores data generated by control processing of the CPU 40.

The device controller 44 is connected to the reading unit 24. The device controller 44 transmits a lighting control signal for controlling lighting/lighting-off of the light source 30, and transmits a current control signal to the reading unit 24 for controlling electric current value in the light source 30. Further, based on an instruction from the CPU 40, the device controller 44 transmits a clock signal CLK and a serial in signal SI to the light receiving portion 31 so as to sequentially operate a large number of the photoelectric transducers 33 in the sensor IC chips CH1-CH6, as illustrated in FIG. 3. The clock signal CLK is a signal to transfer the pixels, and the serial in signal SI is a signal to simultaneously transfer all of the electric signals from the photoelectric transducer 33 to a shift register. Upon reception of these signals from the device controller 44, the reading unit 24 lights the light source 30 and transmits, to the AFE 45, an analog signal based on the light amount that the light receiving portion 31 has received. Here, the light amount irradiated from the light source 30 is determined by a predetermined maximum electric current value and maximum duration where the light source 30 can emit light in the interval of the serial in signals SI.

The AFE 45 is connected to the reading unit 24 and converts an analog signal transmitted from the reading unit 24 into digital data based on an instruction from the CPU 40. The AFE 45 has a predetermined resolution and an input range. For example, in a 10-bit image, the resolution is represented as a grayscale value from "0" to "1023". In this case, the AFE 45 converts the analog signal received from the reading unit 24 into 10-bit (0 to 1023) grayscale data as digital data. The resultant digital data is transmitted from the AFE 45 to the image processing unit 46. The image processing unit 46 has an application specific integrated circuit (ASIC) and performs various image processing (e.g. the shading calibration, a gamma calibration, and other calibrations) on the digital data. The image processing performed by the image processing unit 46 is selectable. That is, the image processing unit 46 can be set not to perform several processing as one setting; alternatively, the image processing unit 46 can be set to perform all the processing as another setting, for example. The image processing unit 46 performs image processing in accordance with a predetermined setting and generates digital image data. The generated digital image data is transmitted via the BUS 48 and stored in the RAM 42.

The drive circuit 47 is connected to the conveying motor MT and drives the conveying motor MT based on a drive instruction received from the CPU 40. The drive circuit 47 rotates the conveying motor MT based on a rotation amount and a rotation direction designated by the drive instruction. When the conveying motor MT is rotated by a predetermined amount, the conveying rollers 23, 26 are rotated by a predetermined angle, whereby the original document GS is conveyed by a predetermined distance along the conveying path 20.

<Operation of Image Reading Apparatus 1>

Following describes the operation of the image reading apparatus 1. The image reading apparatus 1 mainly carries out the main maintenance operation before reading the original document GS and the main reading operation for reading the original document GS. Processing based on steps M1 to M16 in the main maintenance operation, processing based on steps R1 to R8 in the main reading operation, and processing based on steps in each subroutine are executed by the CPU 40. In the embodiment, data processing in the color mode executed by the CPU 40 is performed for pixels which correspond to the three colors; data processing in the monochromatic mode executed by the CPU 40 is performed for pixels that correspond to specific one color. In the embodiment below, processing and operation in the color mode are explained.

(Main Maintenance Operation)

Figure 5:
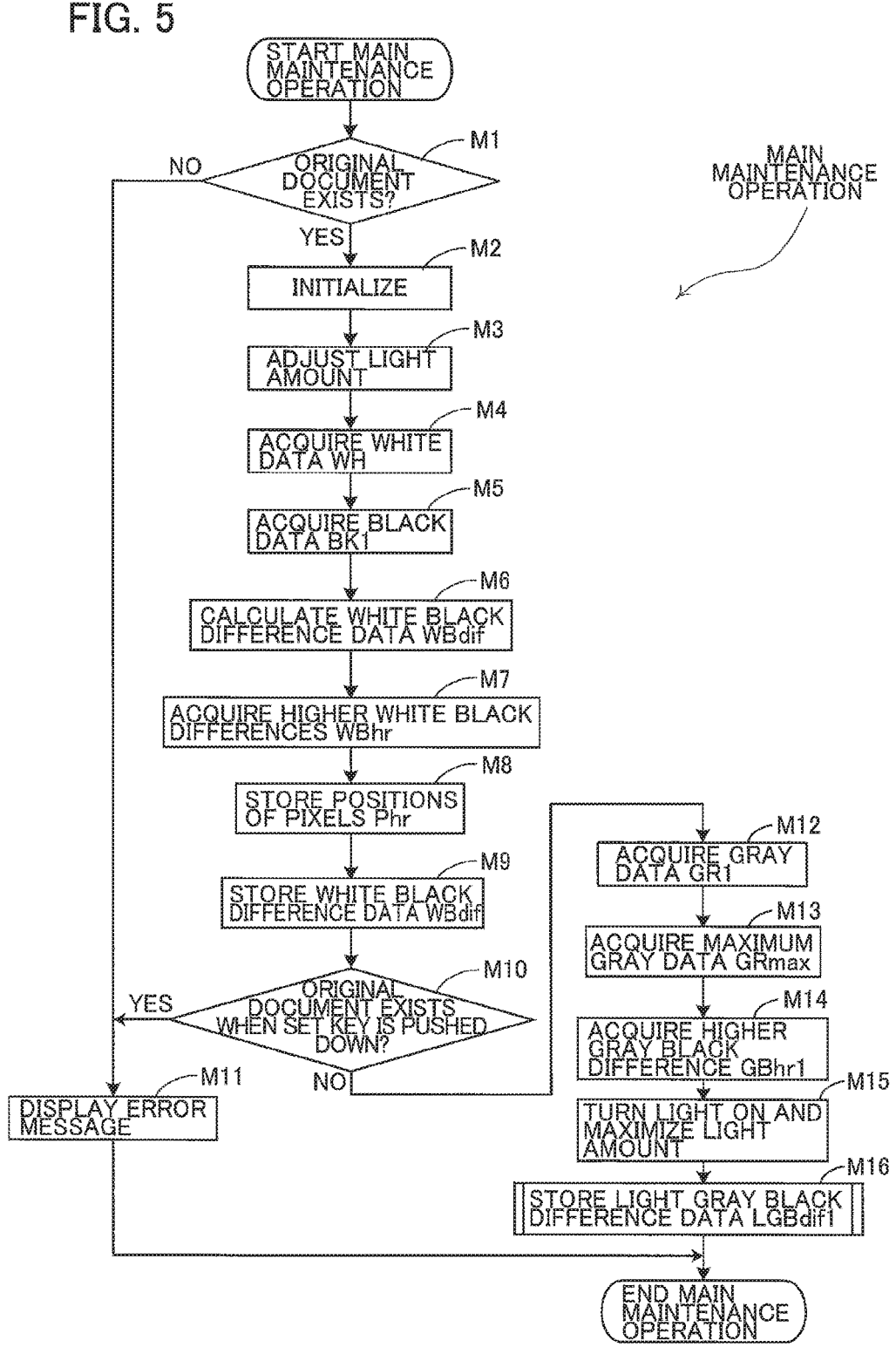
FIG. 5 is a flowchart illustrating a main maintenance operation according to the embodiment.
Figure 6:
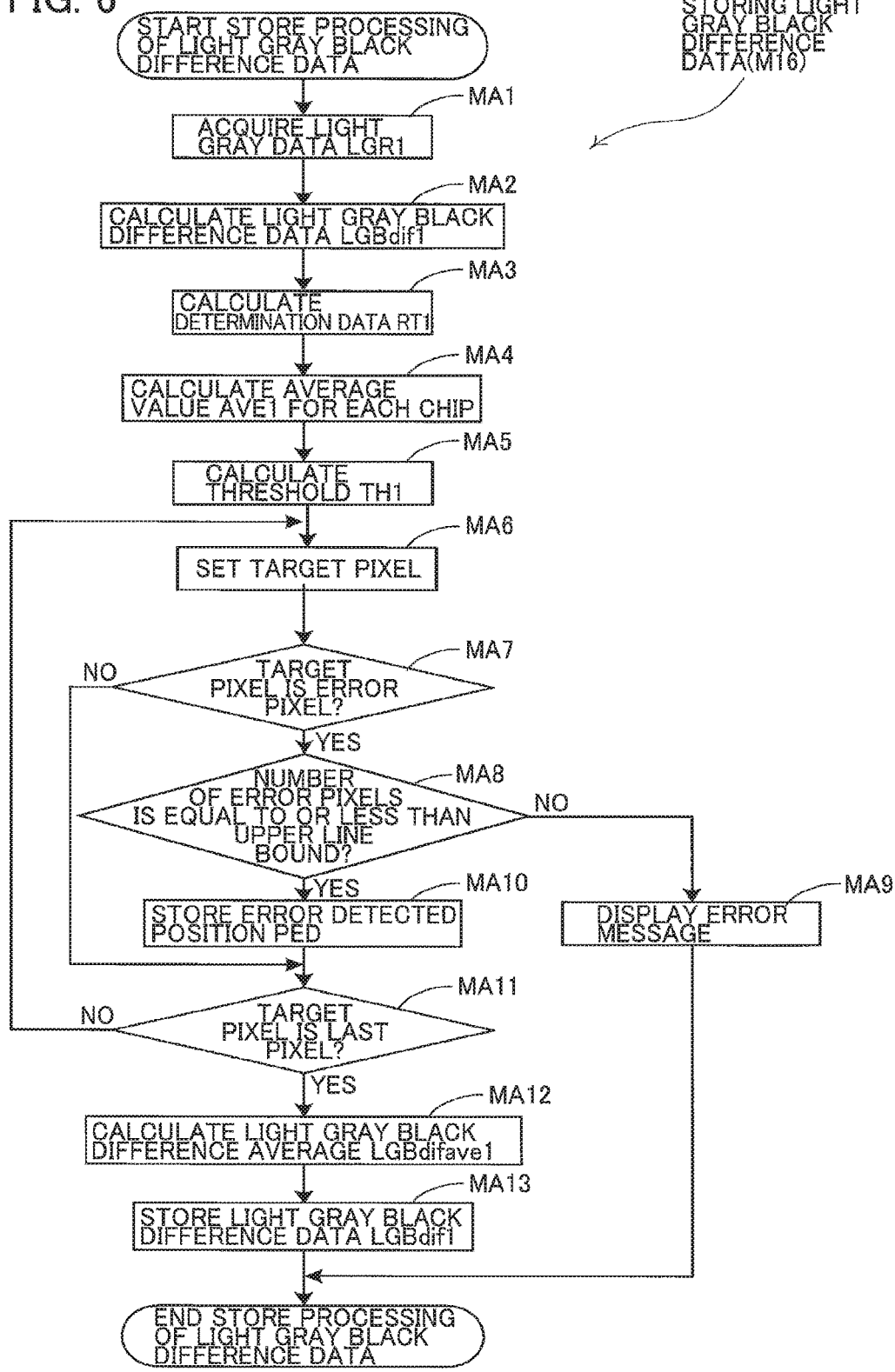
FIG. 6 is a flowchart illustrating processing for storing light gray black difference data according to the embodiment.

The main maintenance operation illustrated in FIG. 5 is started by an operator, e.g. a service man, who operates the operating unit 5 in accordance with a specific procedure during maintenance of the image reading apparatus 1, before or after the image reading apparatus 1 is shipped from a factory.

In the main maintenance operation, when the operator firstly puts a white reference document WGS on the supply tray 2, the document sensor 27 detects the white reference document WGS. On the basis of a signal from the document sensor 27, the CPU 40 determines whether the white reference document WGS exists (M1). When determining that the white reference document WGS exists (M1: Yes), the CPU 40 proceeds to the processing M2. Otherwise, when determining that the white reference document WGS does not exist (M1: No), the CPU 40 proceeds to the processing M11. In the processing M11, an error message is indicated on the display unit 6 so as to notify that the original document GS is wrongly placed, and the main maintenance operation is terminated.

In the processing M2, The CPU 40 conveys the white reference document WGS to the platen glass 25 by employing the drive circuit 47, and initializes the device controller 44, the AFE 45, and the image processing unit 46 (M2). Specifically, the CPU 40 transmits the drive instruction to the drive circuit 47 so that the white reference document WGS on the supply tray 2 is conveyed to the platen glass 25. Further, from the Flash PROM 43, the CPU 40 acquires settings for the clock signal CLK and the serial in signal SI that correspond to reading resolution of 600 dpi, and the CPU 40 then sets up the settings in the device controller 44. The CPU 40 acquires also, from the Flash PROM 43, a setting of signals for the light source 30 corresponding to the color mode, and then sets up the setting in the device controller 44. The CPU 40 acquires an offset adjustment value and a gain adjustment value from the Flash PROM 43, and then sets up these values in the AFE 45. Here, the offset adjustment value is for shifting the level of the analog signal inputted to the AFE 45, and the gain adjustment value is for adjusting the gain of the analog signal inputted to the AFE 45. The CPU 40 sets the image processing unit 46 not to execute any type of image processing.

The CPU 40 adjusts the light amount of the light source 30 in the processing M3. Specifically, the CPU 40 controls the light source 30 to emit light toward the white reference document WGS, such that the analog signal is the maximum value in the input range of the AFE 45 when the reflected light that has been irradiated from the light source 30 is received by the reading unit 24.

The CPU 40 acquires white data WH in the processing M4. Specifically, the CPU 40 controls the light source 30 to emit light in each color having a light amount ST, and reads the white reference document WGS. The CPU 40 then acquires one line worth of the digital image data including pixels in each color, as the white data WH.

The CPU 40 acquires black data BK1 in the processing M5. Specifically, the CPU 40 turns off the light source 30 and reads the white reference document WGS. Then, the CPU 40 acquires one line worth of the digital image data including pixels in one color, as the black data BK1.

The CPU 40 calculates white black difference data WBdif in the processing M6. Specifically, the CPU 40 subtracts the black data BK1 from the white data WH of each pixel for one line worth in each color, and then stores in the RAM 42 the data generated by the subtraction, as the black difference data WBdif.

The CPU 40 acquires higher white black differences WBhr in the processing M7. Specifically, the CPU 40 chooses the 16 largest white black difference data WBdif from among the white black difference data WBdif of the pixels in red color for one line worth, which has been acquired in the processing M6. Then, the 16 white black difference data WBdif are recognized by the CPU 40 as the higher white black differences WBhr corresponding to red color. Similarly, the CPU 40 chooses the 16 largest white black difference data WBdif from among the white black difference data WBdif of the pixels in blue color, and recognizes the 16 white black difference data WBdif as the higher white black differences WBhr corresponding to blue color. Further, the CPU 40 chooses the 16 largest white black difference data WBdif from among the white black difference data WBdif of the pixels in green color, and recognizes the 16 white black difference data WBdif as the higher white black differences WBhr corresponding to green color.

In the processing M8, the CPU 40 stores pixel positions Phr corresponding to the higher white black differences WBhr. The CPU 40 stores the higher white black differences WBhr corresponding to the three colors that have been acquired in the processing M7 and the pixel positions Phr corresponding to the three colors. Specifically, the higher white black differences WBhr of the 16 pixels in each color and those pixel positions Phr are stored in the Flash PROM 43 in correlation with each other.

In the processing M9, the CPU 40 stores the white black difference data WBdif. Specifically, in the Flash PROM 43, the CPU 40 stores the white black difference data WBdif in each color of each pixel for one line worth, which has been calculated in M6.

When the processing M9 ends, the CPU 40 sets the image reading apparatus 1 to a suspended state until a set key positioned on the operating unit 5 is pressed down (M10).

When the operator removes the white reference document WGS and presses the set key down, the CPU 40 determines whether the document sensor 27 indicates an off-state. When the CPU 40 determines that the document sensor 27 indicates the off-state (M10: Yes), the CPU 40 proceeds to the processing M12. When the CPU 40 determines that the document sensor 27 indicates an on-state (M10: No), the CPU 40 proceeds to the processing M11. In the processing M11, the CPU 40 indicates an error message on the display unit 6 (M11) for notifying that the original document GS is wrongly placed, and then ends the main maintenance operation.

The CPU 40 acquires gray data GR1 in the processing M12. Specifically, the CPU 40 acquires the digital image data of each pixel for one line worth in each color as the gray data GR1, while the CPU 40 controls the light source 30 to illuminate the gray reference plate 34 with light having the light amount ST in each color.

The CPU 40 acquires maximum gray data GRmax in the processing M13. The CPU 40 acquires the maximum value from among the gray data GR1 in each color of the pixels for one line worth that have been obtained in the processing M12, as the maximum gray data GRmax. In the Flash PROM 43, the CPU 40 stores the colors and the maximum gray data GRmax of each color in correlation with each color.

The CPU 40 acquires higher gray-black differences BGhr1 in the processing M14. Specifically, the CPU 40 subtracts the black data BK1 from the gray data GR1 of each pixel for one line worth in each color, and thus obtains gray black difference data GBdif1. The CPU 40 acquires the gray black difference data GBdif1 at the 16 pixel positions Phr for each color, as the higher gray black differences GBhr1 in each color.

In the processing M15, the CPU 40 controls the light source 30 to emit the maximum amount of light in each color. Specifically, the CPU 40 turns on the light source 30 by employing a maximum current value predetermined for each color and a maximum duration of lighting that is predetermined for the reading resolution of 600 dpi.

In the processing M16, the CPU 40 stores light gray black difference data LGBdif1 in the Flash PROM 43. The CPU 40 acquires light gray data LGR1 of each pixel for one line worth in each color, while the gray reference plate 34 is illuminated by light having the maximum light amount (further details will be described later). The CPU 40 calculates the light gray black difference data LGBdif1 by subtracting the black data BK1 from the light gray data LGR1 of each pixel for one line worth in each color. The CPU 40 stores error detected positions PED, which are the positions of pixels that indicate unusual values because of dusts or the like. The CPU 40 then calculates, for all the pixels in each color, an average value of the light gray black difference data LGBdif1 that does not include the error pixels, and stores the average value in the Flash PROM 43 as a light gray black difference average LGBdifave1. The CPU 40 stores, in the Flash PROM 43, the light gray black difference data LGBdif1 of each pixel in each color for one line worth. The CPU 40 ends the processing M16, which is followed by the end of the main maintenance operation.

(Storing Light Gray Black Difference Data LGBdif1 in M16)

When starting the store processing of light gray black difference data (M16), the CPU 40 acquires the light gray data LGR1 (MA1). Specifically, the CPU 40 acquires digital image data of each pixel for one line worth in each color, while the gray reference plate 34 is illuminated by the maximum amount of light from the light source 30, and the digital image data is acquired as the light gray data LGR1.

The CPU 40 calculates the light gray black difference data LGBdif1 in the processing MA2. Specifically, the CPU 40 calculates the light gray black difference data LGBdif1 by subtracting the black data BK1 from the light gray data LGR1 of each pixel for one line worth in each color.

The CPU 40 calculates determination data RT1 in the processing MA3. Specifically, the CPU 40 calculates the determination data RT1 by dividing the light gray black difference data LGBdif1 by the white black difference data WBdif of each pixel for one line worth in each color.

In the processing MA4, the CPU 40 calculates average values AVE1 of the sensor IC chips CH1-CH6. Specifically, the CPU 40 divides the determination data RT1 in each color into data groups, each of which corresponds to each of the sensor IC chips CH1-CH6. The CPU 40 calculates an average value of the determination data RT1 for each data group in each color, thereby obtaining the average values AVE1 for the six sensor IC chips in each color.

The CPU 40 calculates a threshold TH1 in the processing MA5. Specifically, the CPU 40 calculates white thresholds WTH1 by adding a maintenance additional value to each of the average values AVE1, which have been calculated in MA4 for the sensor IC chips CH1-CH6. The CPU 40 calculates black thresholds BTH1 by subtracting a maintenance subtractive value to each of the average values AVE1, which have been calculated in MA4 for the sensor IC chips CH1-CH6. In the following description, the threshold TH1 is also referred to as the white threshold WTH1 or as the black threshold BTH1. Here, the maintenance additional value and the maintenance subtractive value are set to each of the sensor IC chips CH1-CH6, and the maintenance additional value and the maintenance subtractive value are equal to 5% of the average value AVE1 in each sensor IC chip. The maintenance additional value is equal to the maintenance subtractive value in corresponding one of the sensor IC chips CH1-CH6, whereby effects on the light gray black difference data LGBdif1 caused by black dusts and white dusts can be approximately the same. Here, black dusts decrease the output, and white dusts increase the output.

The CPU 40 sets a target pixel in the processing MA6. Specifically, if the target pixel has already been set, the CPU 40 finds a pixel next to the target pixel and set the pixel as a new target pixel. If the target pixel has not been set, the CPU 40 sets the first pixel as the target pixel. The CPU 40 counts the number of pixels that have been set as the target pixels, whereby the CPU 40 acquires a reference number of each target pixel and stores the reference number in the RAM 42. The CPU 40 divides the reference number by the number of pixels included in the sensor IC chip, and the CPU 40 then rounds the quotient down to the nearest integer. Further, the CPU 40 adds 1 (one) to the resultant integer, whereby the CPU 40 acquires a chip number. The CPU 40 stores the chip number in the RAM 42.

The CPU 40 determines whether the target pixel is the error pixel in the processing MA7. Specifically, the CPU 40 determines whether the light gray black difference data LGBdif1 in red color falls within the range from the black threshold BTH1 to the white threshold WTH1 inclusive, where the black threshold BTH1 and the white threshold WTH1 correspond to the chip number of the sensor IC chip that includes the target pixel. If the light gray black difference data LGBdif1 in red color is within the range (MA7: No), the CPU 40 determines that the target pixel is not the error pixel and proceeds to the processing MA11. Otherwise, if the light gray black difference data LGBdif1 in red color is out of the range (MA7: Yes), the CPU 40 determines that the target pixel is the error pixel and proceeds to processing MA8.

In the processing MA8, the CPU 40 determines whether the number of the error pixels is equal to or less than a upper line bound. Specifically, the CPU 40 adds 1 (one) to a counter CTa that indicates the number of the error pixels in one line. The CPU 40 determines whether the counter CTa is greater than the upper line bound (e.g. 25 pixels). If the counter CTa is greater than the upper line bound (MA8: No), the CPU 40 determines that the number of the error pixels is greater than the upper line bound and proceeds to the processing MA9. In the processing MA9, the CPU 40 displays an error message on the display unit 6, and ends the store processing M16 of light gray black difference data. If the counter CTa is not greater than the upper line bound (M8: Yes), the CPU 40 determines that the number of the error pixels is not greater than the upper line bound and proceeds to the processing MA10.

The CPU 40 stores positions of the error pixels as error detected positions PED in the Flash PROM 43 in the processing MA10. Specifically, the CPU 40 stores the reference numbers of the error pixels as the error detected positions PED in the Flash PROM 43.

In the processing MA11, the CPU 40 determines whether the target pixel is the last pixel. Specifically, the CPU 40 determines whether the reference number of the target pixel coincides with the reference number of the last pixel. If the reference number of the target pixel coincides with the reference number of the last pixel (MA11: Yes), the CPU 40 deletes the reference number, chip number, and the counter CTa that have been stored in the processing MA6 and proceeds to MA12. If the reference number of the target pixel does not coincide with the reference number of the last pixel (MA11:No), the CPU 40 proceeds to MA6.

In the processing MA12, the CPU 40 calculates the light gray black difference average LGBdifave1. Specifically, the CPU 40 calculates an average value of the light gray black difference data LGBdif1 for all the pixels for one line worth in each color, and the CPU 40 then stores the average value as the light gray black difference average LGBdifave1 in the Flash PROM 43.

In the processing MA13, the CPU 40 stores the light gray black difference data LGBdif1 for one line worth in the Flash PROM 43 that has been calculated in MA2. The CPU 40 ends the store processing of light gray black difference data (M16).

(Main Reading Operation)

The main reading operation is started by the user's operation where the original document GS is placed on the supply tray 2 and the operating unit 5 is pressed. The explanation of the main reading operation according to the embodiment (R1-R8) is based on the condition where the color mode is selected.

The CPU 40 initializes the device controller 44, the AFE 45, and the image processing unit 46 in the processing R1. Specifically, the CPU 40 acquires settings of the clock signal CLK corresponding to the resolution of 600 dpi and the serial in signal SI from the Flash PROM 43, and then sets up the settings in the device controller 44. The CPU 40 acquires settings of a signal for the light source 30 in the color mode from the Flash PROM 43, and then sets the acquired settings in the device controller 44. The CPU 40 acquires the offset adjustment value and the gain adjustment value from the Flash PROM 43, and sets the values in the device controller 44. The CPU 40 sets the image processing unit 46 so as not to perform any image processing.

The CPU 40 adjusts the light amount ST of the light source 30 in the processing R2. The CPU 40 controls the light source 30 to emit light having the light amount ST in each color, so that the maximum value of the read digital image data is equal to the maximum gray data GRmax in each color.

The CPU 40 acquires gray data GR2 in the processing R3. The CPU 40 illuminates the gray reference plate 34 with the light having the light amount ST to read the digital image data, and acquires the read digital image data of each pixel for one line worth in each color as the gray data GR2.

The CPU 40 acquires black data BK2 in the processing R4. Specifically, the CPU 40 reads the gray reference plate 34 without emitting light from the light source 30. The light source 30 then acquires the digital image data of each pixel for one line worth in one color as the black data BK2.

The CPU 40 acquires higher gray black differences GBhr2 in the processing R5. Specifically, the CPU 40 calculates gray black difference data GBdif2 by subtracting the black data BK2 from the gray data GR2 of each pixel for one line worth in each color. The CPU 40 then acquires gray black difference data GBdif2 at the 16 pixel positions Phr, as the higher gray black differences GBhr2.

The CPU 40 controls the light source 30 to emit the light having the maximum light amount in each color in the processing R6. Specifically, the CPU 40 turns on the light source 30 by using the maximum current value and the maximum lighting duration corresponding to the resolution of 600 dpi.

The CPU 40 calculates a reference data CD in the processing R7. Specifically, the CPU 40 acquires light gray data LGR2 of each pixel for one line worth when the gray reference plate 34 is illuminated by the maximum amount of light in each color. The CPU 40 acquires light gray black difference data LGBdif2 by subtracting the black data BK2 from the light gray data LGR2 of each pixel in each color for one line worth. The values of error pixels that indicate unusual values caused by dusts or the like are replaced by the CPU 40 to values of peripheral pixels that are positioned adjacent to or around the error pixels. The CPU 40 calculates an average value of the light gray black difference data LGBdif2 as a light gray black difference average LGBdifave2. The CPU 40 calculates the reference data CD of each pixel for one line worth in each color by multiplying the white black difference data WBdif, a change ratio SCRT, an average ratio AVRT, and a gray ratio GRRT together. The detailed explanation of the change ratio SCRT, the average ratio AVRT, and the gray ratio GRRT will be described later.

The CPU 40 executes the reading operation in the processing R8. Specifically, in the image processing unit 46, the CPU 40 sets up setting values for execution of each image processing. The CPU 40 outputs an instruction to the drive circuit 47 to convey the original document GS. In accordance with the instructions from the CPU 40, the reading unit 24 reads the original document GS, and the image processing unit 46 executes the shading calibration and other calibration to generate the digital image data. In the end of the reading operation (R8), the main reading operation ends the processing.

(Calculating Reference Data CD)

Figure 8:
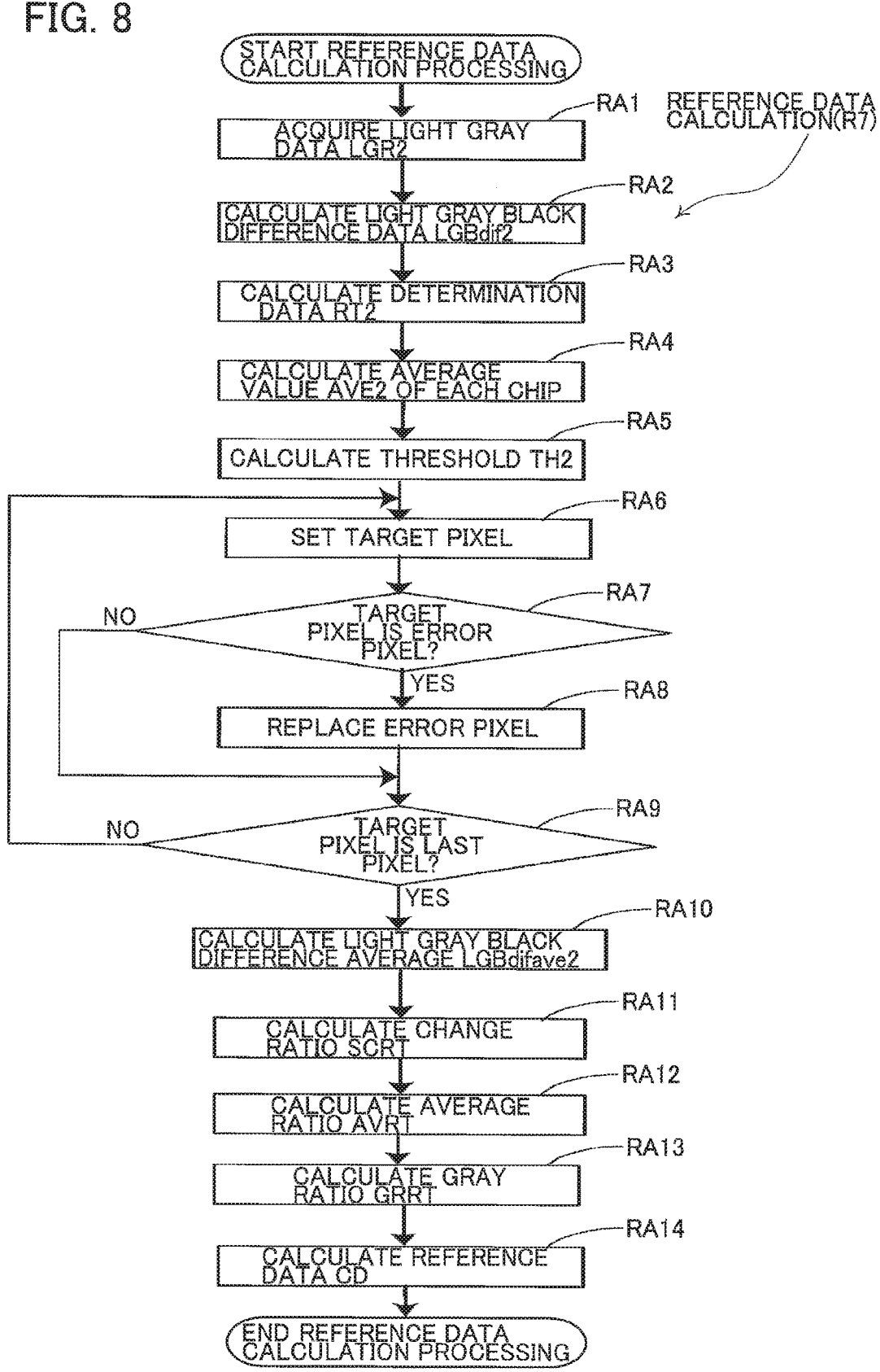
FIG. 8 is a flowchart illustrating calculating processing of reference data according to the embodiment.

When starting the processing R7 for calculating the reference data as illustrated in FIG. 8, the CPU 40 acquires the light gray data LGR2 in the processing RA1. Specifically, the CPU 40 turns on the light source 30 to emit the maximum amount of light toward the gray reference plate 34. The CPU 40 acquires the digital image data of each pixel for one line worth in each color, as the light gray data LGR2.

The CPU 40 calculates light gray black difference data LGBdif2 in the processing RA2. Specifically, the CPU 40 calculates the light gray black difference data LGBdif2 by subtracting the black data BK2 from the light gray data LGR2 of each pixel for one line worth in each color.

The CPU 40 calculates determination data RT2 in the processing RA3. Specifically, the CPU 40 divides the light gray black difference data LGBdif2 by the light gray black difference data LGBdif1 of each of the pixels for one line worth in each color so as to calculate the determination data RT2 of each pixel for one line worth in each color.

In the processing RA4, the CPU 40 calculates average values AVE2, each of which is an average value of each sensor IC chip CH1-CH6 in each color. Specifically, the CPU 40 divides the determination data RT2 of the pixels for one line worth into data groups in each color, each of which corresponds to each of the sensor IC chips CH1-CH6. The CPU 40 calculates an average value of the determination data RT2 in each data group to thereby acquire the average value AVE2 in each color.

The CPU 40 calculates a threshold TH2 in the processing RA5. Specifically, the CPU 40 calculates a white threshold by adding a reading additional value to the average value AVE2 for each of the sensor IC chips CH1-CH6. The CPU 40 calculates a black threshold BTH2 by subtracting a reading subtractive value from the average value AVE2 for each of the sensor IC chips CH1-CH6. The threshold TH2 is also referred to as the white threshold WTH2 or as the black threshold BTH2. Here, each of the reading additional value and the reading subtractive value corresponds to 5% of the average value AVE2 in corresponding one of the sensor IC chips CH1-CH6. Further, the reading additional value and the reading subtractive value are the same value, whereby effects on the image quality caused by black dusts and white dusts can be approximately the same. Here, black dusts decrease the output, and white dusts increase the output.

The CPU 40 sets a target pixel in the processing RA6. Similarly to the processing MA6, if the target pixel has already been set, the CPU 40 finds a pixel next to the target pixel and set the pixel as a new target pixel. If the target pixel has not been set, the CPU 40 sets the first pixel as the target pixel. Similarly to the processing MA6, the CPU 40 acquires a reference number of each target pixel and stores the reference number in the RAM 42. The CPU 40 stores in the RAM 42 the chip number of the sensor IC chip that includes the target pixel.

The CPU 40 determines whether the target pixel is the error pixel in the proceeding RA7. Specifically, the CPU 40 determines whether the light gray black difference data LGBdif2 in red color falls within the range from the black threshold BTH2 to the white threshold WTH2 inclusive, where the black threshold BTH2 and the white threshold WTH2 correspond to the chip number of the sensor IC chip that includes the target pixel. If the light gray black difference data LGBdif2 in red color is not within the range (RA7: Yes), the CPU 40 determines that the target pixel is the error pixel, and proceeds to the processing RA8.

If the light gray black difference data LGBdif2 in red color is within the range, the CPU 40 determines whether the target pixel is positioned at the error detected position PED. If the target pixel is positioned at the error detected position PED (RA7: Yes), the CPU 40 determines that the target pixel is the error pixel and proceeds to the processing RA8. If the target pixel is not positioned at the error detected position PED (RA7: No), the CPU 40 determines that the target pixel is not the error pixel and proceeds to the processing RA9.

The CPU 40 replaces the light gray black difference data LGBdif1, LGBdif2 of the target pixel with those of the peripheral pixel. Specifically, in each color, the CPU 40 replaces the light gray black difference data LGBdif1 of the target pixel with the light gray black difference data LGBdif1 of a pixel in the sensor IC chip having the same chip number as the target sensor IC chip, and further replaces the light gray black difference data LGBdif2 of the target pixel with the light gray black difference data LGBdif2 of a pixel in the sensor IC chip having the same chip number as the target sensor IC chip. The positions of the replacing pixels are the same between the light gray black difference data LGBdif1 and the light gray black difference data LGBdif2.

The CPU 40 determines whether the target pixel is the final pixel in the processing RA9. Specifically, the CPU 40 determines whether the reference number stored in the processing RA6 coincides with the reference number of the final pixel. If the reference number stored in the processing RA6 coincides with the reference number of the final pixel (RA9: Yes), the CPU 40 deletes the reference number and the chip number and proceeds to the processing RA10. Otherwise, if the reference number stored in the processing RA6 does not coincide with the reference number of the final pixel (RA9: No), the CPU 40 proceeds to the processing RA6.

The CPU 40 calculates light gray black difference average LGBdifave2 in the processing RA10. Specifically, the CPU 40 calculates an average of the light gray black difference data LGBdif2 in each color of all the pixels for one line worth, and stores the average as the light gray black difference average LGBdifave2 in the Flash PROM 43.

The CPU 40 calculates change ratio SCRT in the processing RA11. The CPU 40 divides the light gray black difference data LGBdif2 by the light gray black difference data LGBdif1 to calculate the change ratio SCRT.

The CPU 40 calculates an average ratio AVRT in the processing RA12. Specifically, the CPU 40 divides the light gray black difference average LGBdifave1 by the light gray black difference average LGBdifave2 to calculate the average ratio AVRT.

The CPU 40 calculates gray ratio GRRT in the processing RA13. Specifically, the CPU 40 divides the higher gray black difference GBhr2 by the higher gray black difference GBhr1 at each pixel position Phr in each color, and calculates the average value of the 16 quotients as the gray ratio GRRT in each color.

The CPU 40 calculates reference data CD in the processing RA14. Specifically, the CPU 40 multiplies the white black difference data WBdif by the change ratio SCRT that have been stored in the processing M9. The CPU 40 then multiplies the product, the gray ratio GRRT, and the average ratio AVRT together to thereby calculate the reference data CD.

<Technical Effect>

In the processing MA1 included in the storing processing M16 of the light gray black difference data LGBdif1 in the main maintenance operation according to the embodiment, the light gray data LGR1 is acquired while the light source 30 illuminates the gray reference plate 34 with the maximum amount of light. In the processing MA2 for calculating the light gray black difference data LGBdif1, the CPU 40 calculates the light gray black difference data LGBdif1 by subtracting the black data BK1 from the light gray data LGR1. In the processing RA1 for acquiring the light gray black difference data LGBdif2, which is included in the processing R7 for calculating the reference data CD, the CPU 40 turns on the light source 30 to emit the maximum amount of light toward the gray reference plate 34, and the CPU 40 then acquires the light gray data LGR2. In the processing RA2 for calculating the light gray black difference data LGBdif2, the CPU 40 calculates the light gray black difference data LGBdif2 by subtracting the black data BK2 from the light gray data LGR2. In the processing RA11 for calculating the change ratio SCRT, the CPU 40 divides the light gray black difference data LGBdif2 by the light gray black difference data LGBdif1 to obtain the change ratio SCRT. In the processing RA14 for calculating the reference data CD, the CPU 40 multiplies the white black difference data WBdif by the change ratio SCRT. Accordingly, in the calculation of the reference data CD, the CPU 40 can reduce the variation of output caused by difference of the color density between the gray reference plate 34 and the white reference plate. Further, since the image reading apparatus 1 uses the gray reference plate 34, the image reading apparatus 1 can read the original document without causing the shadowing phenomenon.

In the processing MA12 for calculating the light gray black difference average LGBdifave1 calculates the average value of all the pixels in the light gray black difference data LGBdif1 for one line worth, and stores the average value in the Flash PROM 43 as the light gray black difference average LGBdifave1. In the processing RA10 for calculating the light gray black difference average LGBdifave2, the CPU 40 calculates the average of the light gray black difference data LGBdif2 of all the pixels for one line worth, and stores the average value as the light gray black difference average LGBdifave2 in the Flash PROM 43. In the processing RA12 for calculating the average ratio AVRT, the CPU 40 calculates the average ratio AVRT by dividing the light gray black difference average LGBdifave1 by the light gray black difference average LGBdifave2. In the processing RA14 for calculating the reference data CD, the CPU 40 multiplies the white black difference data WBdif, the change ratio SCRT, and the average ratio AVRT together, whereby the CPU 40 calculates the reference data CD. Accordingly, even when the light amount of the light source 30 has been degraded between the main maintenance operation and the main reading operation, the CPU 40 can reduce the effect of the degradation to calculate the calibration data.

In the processing M14 for acquiring the higher gray-black difference BGhr1 of the main maintenance operation, the CPU 40 subtracts the black data BK1 from the gray data GR1, whereby the CPU 40 obtains the gray black difference data GBdif1. The CPU 40 then acquires the gray black difference data GBdif1 of the 16 pixels positioned at the pixel positions Phr, as the higher gray black differences GBhr1. In the processing R5 for acquiring the higher gray-black difference BGhr2 in the main reading operation, the CPU 40 subtracts the black data BK2 from the gray data GR2, whereby the CPU 40 obtains the gray black difference data GBdif2. The CPU 40 then acquires the gray black difference data GBdif2 of the 16 pixels positioned at the pixel positions Phr, as higher gray black differences GBhr2. In the calculation processing RA13, the CPU 40 divides the higher gray black difference GBhr2 by the higher gray black difference GBhr1 for each of the 16 pixels in each color, and calculates the average value of the 16 pixels as the gray ratio GRRT. In the processing RA14 for calculating the reference data CD, the CPU 40 multiplies the white black difference data WBdif, the change ratio SCRT, the gray ratio GRRT, and the average ratio AVRT together to thereby calculate the reference data CD. Accordingly, even when the color density of the gray reference member has been changed, the CPU 40 can reduce the effect of the color density change to appropriately calculate the calibration data.

In the processing MA6 to MA11 of the main maintenance operation according to the embodiment, the CPU 40 sets the target pixel sequentially and determines whether the target pixel is the error pixel. If determining the target pixel is the error pixel, the CPU 40 stores the error detected position PED and the reference number of the target pixel at the error detected position PED. In the processing RA6 to RA9 of the main reading operation, the CPU 40 sets the target pixel sequentially and determines whether the target pixel is the error pixel. If determining that the target pixel is the error pixel, the CPU 40 replaces the light gray black difference data LGBdif1, LGBdif2 with the light gray black difference data LGBdif1, LGBdif2 of the peripheral pixel. Since the CPU 40 replaces the light gray black difference data LGBdif2 as well as the light gray black difference data LGBdif1, the CPU 40 can calculate the change ratio SCRT with high accuracy.

[Correspondence Between Embodiment and Disclosure]

The image reading apparatus 1, and the gray reference plate 34 are examples of an image reading apparatus and a gray reference member, respectively. The reading unit 24 and the AFE 45 are an example of reading unit. The device controller 44 and the image processing unit 46 are examples of an adjusting unit and a calibration unit, respectively. The PROM Flash PROM 43 and the CPU 40 are examples of a storage unit and a control unit. The processing M5 for acquiring the black data BK1 is an example of first black data acquiring processing. The processing M4 for acquiring the white data WH is an example of a white data acquiring processing. The processing M6 for calculating the white black difference data WBdif is an example of white black difference data calculating processing. The processing MA1 for acquiring the light gray data LGR1 is an example of the first light gray acquiring processing. The processing MA2 for calculating the light gray black difference data LGBdif1 is an example of the first light gray black difference data calculating processing. The processing R4 for acquiring the black data BK2 is an example of the second black data acquiring processing. The processing RA1 for acquiring the light gray data LGR2 is an example of the second light gray data acquiring processing. The processing RA2 for calculating the light gray black difference data LGBdif2 is an example of the second light gray black difference data calculating processing. The processing RA11 for calculating the change ratio SCRT is an example of the change ratio calculating processing. The processing RA14 for calculating the reference data CD is an example of the calibration data calculating processing.

The processing MA12 for calculating the light gray black difference average LGBdifave1 is an example of first average calculating processing. The processing RA10 for calculating the light gray black difference average LGBdifave2 is an example of second average calculating processing. The processing RA12 for calculating average ratio AVRT is an example of average ratio calculating processing. The processing M12 for acquiring the gray data GR1 is first gray data acquiring processing. The processing M14 for acquiring the higher gray-black difference BGhr1 is an example of first gray black difference calculation processing and first extracting processing. The processing R3 for acquiring the gray data GR2 is an example of second gray data acquiring processing. The processing R5 for acquiring the higher gray-black difference GBhr2 is an example of the second gray black difference calculating processing and second extracting processing. The processing RA13 for calculating the gray ratio GRRT is an example of gray ratio calculating processing. The processing RA3 for calculating the determination data RT2 is an example of first determination processing. The processing RA7 for determining whether the target pixel is the error pixel and the processing RA8 for replacing the error pixel are examples of replacing processing. The processing MA3 for calculating the determination data RT2 is an example of second determination processing. The processing for acquiring MA7 for determining whether the target pixel is the error pixel is determining processing.

[Modifications]

While the description has been made in detail with reference to specific embodiment thereof, it would be apparent to those skilled in the art that various changes and modifications may be made therein without departing from the spirit and scope of the above described embodiment.

(1) The image reading apparatus 1 according to the embodiment can be included in a multifunction machine that has a printing unit. The image reading apparatus 1 according to the embodiment includes the single reading unit 24 and the single gray reference plate 34; alternatively, the image reading apparatus 1 may include two reading units and two gray reference plates.

Figure 7:
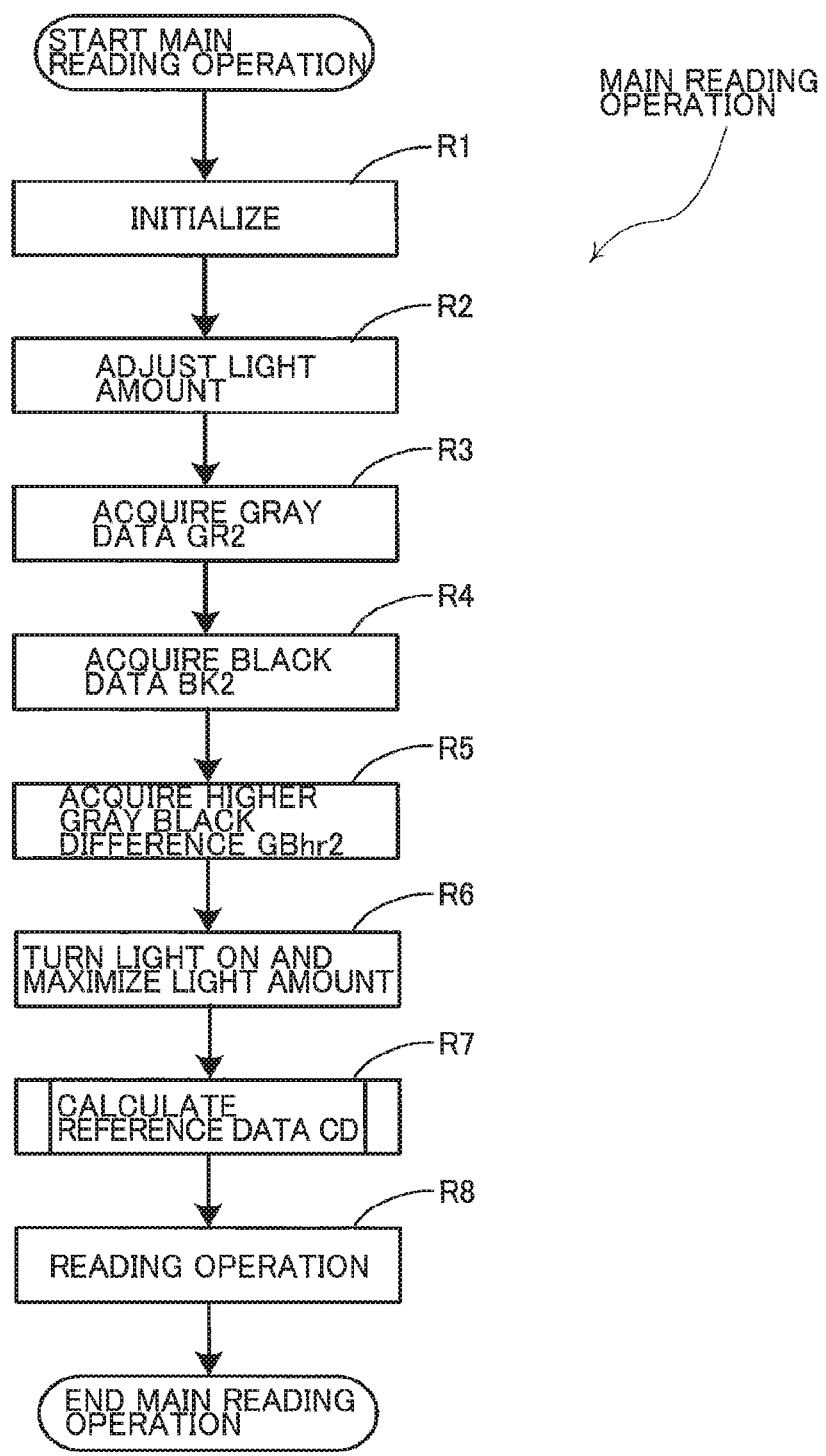
FIG. 7 is a flowchart illustrating a main reading operation according to the embodiment.

(2) In the embodiment, the CPU 40 executes every processing in the main maintenance operation illustrated in FIG. 5 and the main reading operation illustrated in FIG. 7, and the disclosure is not limited to the embodiment. Alternatively, part of the processing M3 to M9 in the main maintenance operation and part of the processing M12 to M16 may be executed by the image processing unit 46, the device controller 44, or the AFE 45. Further, the main maintenance operation may be executed by an external device (e.g. a computer) that is independent from the image reading apparatus 1.

(3) In the embodiment, the main maintenance operation and the main reading operation, which are illustrated in FIG. 5 and FIG. 7 respectively, are executed in the color mode. Alternatively, the monochromatic mode where one line includes single color may be selected instead of the color mode, where one line includes three colors.

What is claimed is:

1. An image reading apparatus comprising:
a gray reference member colored in a gray color having a reflection ratio lower than that of white;
a reading unit configured to irradiate light onto an original document or the gray reference member to read images thereon on a line-by-line basis and produce image data;
an adjusting unit configured to apply an adjustment value to the reading unit, the reading unit adjusting a light amount to be irradiated onto the original document and the gray reference member in a range from zero to maximum in accordance with the adjustment value;
a calibration unit configured to calibrate shading of the image;
a storage unit; and
a control unit configured to execute a first preprocessing and a second preprocessing,
the second preprocessing being executed after execution of the first preprocessing,
the first preprocessing executed by the control unit including:
(a) reading, with the reading unit, the original document and the gray reference member without irradiating light thereonto and producing one line worth of the image data relating to pixels arranged in one line;
(b) acquiring first black data from the one line worth of the image data produced in (a);
(c) reading, with the reading unit, a white color document upon irradiating the white color document with the light having a light amount adjusted by a first adjustment value and producing one line worth of the image data relating to pixels arranged in one line;
(d) acquiring white data from the one line worth of the image data produced in (c);
(e) calculating, on a pixel-to-pixel basis, white-black difference data by subtracting the first black data from the white data and storing the white-black difference data in the storage unit;
(f) reading, with the reading unit, the gray reference member upon irradiating the gray reference member with the light having the maximum light amount and producing one line worth of the image data relating to pixels arranged in one line;
(g) acquiring first light gray data from the pixels in the one line worth of the image data produced in (f); and
(h) calculating, on a pixel-to-pixel basis, first light gray-black difference data by subtracting the first black data from the first light gray data and storing the first light gray-black difference data in the storage unit; and
the second preprocessing executed by the control unit including:
(i) reading, with the reading unit, the original document and the gray reference member without irradiating light thereonto and producing one line worth of the image data relating to pixels arranged in one line;
(j) acquiring second black data from the one line worth of the image data produced in (i);
(k) reading, with the reading unit, the gray reference member upon irradiating the gray reference member with the light having the maximum amount and producing one line worth of the image data relating to pixels arranged in one line;
(l) acquiring second light gray data from the one line worth of image data produced in (k);
(m) calculating, on a pixel-to-pixel basis, second light gray-black difference data by subtracting the second black data from the second light gray data and storing the second light gray-black difference data in the storage unit;
(n) calculating, on a pixel-to-pixel basis, a change ratio by dividing the second light gray-black difference data by the first light gray-black difference data; and
(o) calculating, on a pixel-to-pixel basis, calibration data by multiplying the white-black difference data by the change ratio,
wherein shading of the image data is calibrated in response to the calibration data.

2. The image reading apparatus according to claim 1, wherein the first processing executed by the control unit further includes:
(p) acquiring a first average by calculating an average of the first light gray-black difference data with respect to the pixels in one line, to which the one line worth of image data production in (f) is related, and storing the first average in the storage unit, and
wherein the second processing executed by the control unit further includes:
(q) acquiring a second average by calculating an average of the second light gray-black difference data with respect to the pixels in one line to which the one line worth of image data produced in (k) is related; and (r) calculating an average ratio by dividing the first average by the second average; and wherein the calibration data is calculated on a pixel-to-pixel basis, by multiplying the white-black difference data, the change ratio, and the average ratio together.

3. The image reading apparatus according to claim 2, wherein the first preprocessing executed by the control unit further includes:

(s) reading, with the reading unit, the gray reference member upon irradiating the gray reference member with the light having a light amount adjusted by the first adjustment value and producing one line worth of the image data relating to pixels arranged in one line;

(t) acquiring first gray data from the one line worth of the image data produced in (s);

(u) calculating, on a pixel-to-pixel basis, first gray-black difference data by subtracting the first black data from the first gray data;

(v) selecting a prescribed number of higher values from the first gray-black difference data among the pixels arranged in one line to which the one line worth of image data produced in (s) is related, and positions of the pixels corresponding to the higher values; and (w) storing in the storage unit the higher values as first higher values and the positions selected in (v) in correlation with each other; and wherein the second preprocessing executed by the control unit further includes:

(x) reading, with the reading unit, the gray reference member upon irradiating the gray reference member with light having the light amount adjusted by the first adjustment value and producing one line worth of second gray data;

(y) acquiring the second gray data from the one line worth of the image data produced in (x);

(z) calculating, on a pixel-to-pixel basis, second gray-black difference data by subtracting the second black data from the second gray data;

(a1) selecting, as second higher values, the second gray-black difference data at the positions stored in (w); and (b1) calculating quotients by dividing the second higher values by the first higher values at each of the positions stored in (w), and calculating a gray ratio by averaging the quotients; and wherein the calibration data is calculated on a pixel-to-pixel basis, by multiplying the white-black difference data, the change ratio, the average ratio, and the gray ratio together.

4. The image reading apparatus according to claim 1, wherein the second preprocessing executed by the control unit further includes:

(c1) calculating, on a pixel-to-pixel basis, first determination data by dividing the second light gray-black difference data by the first light gray-black difference data;

(d1) specifying a first pixel position where the first determination data falls out of a first range, and a second pixel position where the first determination data falls within the first range; and (e1) replacing the first light gray-black difference data at the first pixel position with the first light gray-black difference data at the second pixel position, and replacing the second light gray-black difference data at the first pixel position with the second light gray-black difference data at the second pixel position.

5. The image reading apparatus according to claim 4, wherein the first processing executed by the control unit further includes:

(f1) calculating, on a pixel-to-pixel basis, second determination data by dividing the first light gray-black difference data by the white-black difference data;

(g1) specifying a third pixel position where the second determination data falls out of a second range, and a fourth pixel position where the second determination data falls within the second range; and (h1) storing the third pixel position in the storage unit, wherein the processing in (e1) further includes:

replacing the first light gray-black difference data at the third pixel position with the first light gray-black difference data at the fourth pixel position, and replacing the second light gray-black difference data at the third pixel position with the second light gray-black difference data at the fourth pixel position.

6. The image reading apparatus according to claim 1, further comprising a sheet conveying device configured to convey the original document along a sheet conveying path, the gray reference member being positioned in the sheet conveying path.

7. The image reading apparatus according to claim 6, wherein the reading unit comprises an image sensor having a plurality of image sensing elements juxtaposed to cover.

8. A method executed in an image reading device having a gray reference member colored in a gray color having a reflection ratio lower than that of white; a reading unit configured to irradiate light onto an original document or the gray reference member to read images thereon on a line-by-line basis and produce image data; an adjusting unit configured to apply an adjustment value to the reading unit, the reading unit adjusting a light amount to be irradiated onto the original document and the gray reference member in a range from zero to maximum in accordance with the adjustment value; a calibration unit configured to calibrate shading of the image; a storage unit; and a control unit, the method comprising:

executing a first preprocessing and a second preprocessing, the second preprocessing being executed after executing the first preprocessing, wherein the first preprocessing executed by the control unit includes:

(a2) reading, with the reading unit, the original document and the gray reference member without irradiating light thereonto and producing one line worth of the image data relating to pixels arranged in one line;

(b2) acquiring first black data from the one line worth of the image data produced in (a2);

(c2) reading, with the reading unit, a white color document upon irradiating the light having a light amount adjusted by a first adjustment value and producing one line worth of the image data relating to pixels arranged in one line;

(d2) acquiring white data from the one line worth of the image data produced in (c2);

(e2) calculating, on a pixel-to-pixel basis, white-black difference data by subtracting the first black data from the white data and storing the white-black difference data in the storage unit;

(f2) reading, with the reading unit, the gray reference member upon irradiating the gray reference member with the light having the maximum light amount and producing one line worth of the image data relating to pixels arranged in one line;
(g2) acquiring first light gray data from the pixels in the one line worth of the image data produced in (f2); and
(h2) calculating, on a pixel-to-pixel basis, first light gray-black difference data by subtracting the first black data from the first light gray data and storing the first light gray-black difference data in the storage unit; and wherein the second preprocessing executed by the control unit includes:
(i2) reading with the reading unit the original document and the gray reference member without irradiating the light thereonto and producing one line worth of the image data relating to pixels arranged in one line;
(j2) acquiring second black data from the one line worth of the image data produced in (i2);
(k2) reading, with the reading unit, the gray reference member upon irradiating the gray reference member with the light having the maximum amount and producing one line worth of the image data relating to pixels arranged in one line;
(l2) acquiring second light gray data from the one line worth of image data produced in (k2);
(m2) calculating, on a pixel-to-pixel basis, second light gray-black difference data by subtracting the second black data from the second light gray data and storing the second light gray-black difference data in the storage unit;
(n2) calculating, on a pixel-to-pixel basis, a change ratio by dividing the second light gray-black difference data by the first light gray-black difference data; and
(o2) calculating, on a pixel-to-pixel basis, calibration data by multiplying the white-black difference data by the change ratio, wherein shading of the image data is calibrated in response to the calibration data.

9. The method according to claim 8, wherein the first processing executed by the control unit further includes:
(p2) acquiring a first average by calculating an average of the first light gray-black difference data with respect to the pixels in one line, to which the one line worth of image data produced in (f2) is related, and storing the first average in the storage unit, and wherein the second processing executed by the control unit further includes:
(q2) acquiring a second average by calculating an average of the second light gray-black difference data with respect to the pixels in one line to which the one line worth of image data produced in (k2) is related; and
(r2) calculating an average ratio by dividing the first average by the second average, and wherein the calibration data is calculated on a pixel-to-pixel basis, by multiplying the white-black difference data, the change ratio, and the average ratio together.

10. The method according to claim 9, wherein the first preprocessing executed by the control unit further includes:
(s2) reading, with the reading unit, the gray reference member upon irradiating the gray reference member with the light having a light amount adjusted by the first adjustment value onto the gray reference member and producing one line worth of the image data relating to pixels arranged in one line;
(t2) acquiring first gray data from the one line worth of the image data produced in (s2);
(u2) calculating, on a pixel-to-pixel basis, first gray-black difference data by subtracting the first black data from the first gray data;
(v2) selecting a prescribed number of higher values from the first gray-black difference data among the pixels to which the one line worth of the image data produced in (s2) is related, and positions of the pixels corresponding to the higher values; and
(w2) storing in the storage unit the higher values as first higher values and the positions selected in (v2) in correlation with each other, wherein the second preprocessing executed by the control unit further includes:
(x2) reading, with the reading unit, the gray reference member upon irradiating light having the light amount adjusted by the first adjustment value and producing one line worth of second gray data;
(y2) acquiring the second gray data from the one line worth of the image data produced in (x2);
(z2) calculating, on a pixel-to-pixel basis, second gray-black difference data by subtracting the second black data from the second gray data;
(a3) selecting, as second higher values, the second gray-black difference data at the positions stored in (w2); and
(b3) calculating quotients by dividing the second higher values by the first higher values at each of the positions stored in (w2), and calculating a gray ratio by averaging the quotients, and wherein the calibration data is calculated on a pixel-to-pixel basis, by multiplying the white-black difference data, the change ratio, the average ratio, and the gray ratio together.

11. The method according to claim 8, wherein the second preprocessing executed by the control unit further includes:
(c3) calculating, on a pixel-to-pixel basis, first determination data by dividing the second light gray-black difference data by the first light gray-black difference data;
(d3) specifying a first pixel position where the first determination data falls out of a first range, and a second pixel position where the first determination data falls within the first range; and
(e3) replacing the first light gray-black difference data at the first pixel position with the first light gray-black difference data at the second pixel position, and replacing the second light gray-black difference data at the first pixel position with the second light gray-black difference data at the second pixel position.

12. The method according to claim 11, wherein the first processing executed by the control unit further includes:
(f3) calculating, on a pixel-to-pixel basis, second determination data by dividing the first light gray-black difference data by the white-black difference data;
(g3) specifying a third pixel position where the second determination data falls out of a second range, and a fourth pixel position where the second determination data falls within the second range; and
(h3) storing the third pixel position in the storage unit, and wherein the processing in (e3) further includes:
replacing the first light gray-black difference data at the third pixel position with the first light gray-black difference data at the fourth pixel position, and replacing the second light gray-black difference data at the third pixel position with the second light gray-black difference data at the fourth pixel position.

\* \* \* \* \*

UNITED STATES PATENT AND TRADEMARK OFFICE
CERTIFICATE OF CORRECTION

PATENT NO. : 9,742,930 B2  
APPLICATION NO. : 15/220556  
DATED : August 22, 2017  
INVENTOR(S) : Takashi Matsumi Page 1 of 1

It is certified that error appears in the above-identified patent and that said Letters Patent is hereby corrected as shown below:

In the Claims

In Column 18, Claim 2, Line 62:
Please delete "image data production in (f)" and insert --image data produced in (f)--

Signed and Sealed this
Twentieth Day of February, 2018

Andrei Iancu
*Director of the United States Patent and Trademark Office*